(12) United States Patent
Kim et al.

(10) Patent No.: US 8,877,883 B2
(45) Date of Patent: Nov. 4, 2014

(54) ADHESIVE COMPOSITION FOR POLARIZING PLATE AND POLARIZING PLATE AND OPTICAL MEMBER INCLUDING ADHESIVE LAYER FORMED USING THE SAME

(71) Applicants: Won Kim, Uiwang-si (KR); Yi Eun Kim, Uiwang-si (KR); Chul Jeong, Uiwang-si (KR); Ri Ra Jung, Uiwang-si (KR); Hae Ryong Chung, Uiwang-si (KR)

(72) Inventors: Won Kim, Uiwang-si (KR); Yi Eun Kim, Uiwang-si (KR); Chul Jeong, Uiwang-si (KR); Ri Ra Jung, Uiwang-si (KR); Hae Ryong Chung, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 22 days.

(21) Appl. No.: 13/727,703

(22) Filed: Dec. 27, 2012

(65) Prior Publication Data
US 2013/0165561 A1     Jun. 27, 2013

(30) Foreign Application Priority Data

Dec. 27, 2011 (KR) .......................... 10-2011-0143778

(51) Int. Cl.
*C08F 220/10*    (2006.01)
*C09J 133/08*    (2006.01)
*C09J 133/02*    (2006.01)

(52) U.S. Cl.
CPC ............... *C09J 133/08* (2013.01); *C09J 133/02* (2013.01); *C08L 2312/00* (2013.01)
USPC .................................... 526/328.5; 526/329.7

(58) Field of Classification Search
USPC .......................................... 326/329.7, 328.5
See application file for complete search history.

(56) References Cited

U.S. PATENT DOCUMENTS

2004/0242741 A1* 12/2004 Wamprecht et al. .......... 524/262

* cited by examiner

*Primary Examiner* — Kuo-Liang Peng
(74) *Attorney, Agent, or Firm* — Lee & Morse, P.C.

(57) ABSTRACT

A polarizing plate and an optical member, the polarizing plate including an adhesive layer, the adhesive layer being prepared from an adhesive composition including a (meth)acrylic copolymer, a crosslinking agent, and a tackifier, the tackifier including an acrylic modified petroleum resin represented by Formula 1:

$$R'—CO—O—R \qquad \text{[Formula 1]}$$

wherein R' is a petroleum resin and R is a $C_1$-$C_{20}$ alkyl group or a $C_6$-$C_{50}$ aryl group.

16 Claims, 2 Drawing Sheets

ADHESIVE COMPOSITION FOR POLARIZING PLATE AND POLARIZING PLATE AND OPTICAL MEMBER INCLUDING ADHESIVE LAYER FORMED USING THE SAME

CROSS-REFERENCE TO RELATED APPLICATION

The present application claims priority under 35 U.S.C. §119 to Korean Patent Application No. 10-2011-0143778, filed on Dec. 27, 2011, in the Korean Intellectual Property Office, and entitled: "Adhesive Composition For Polarizing Plate And Polarizing Plate And Optical Member Including Adhesive Layer Formed Using The Same," which is incorporated by reference herein in its entirety.

BACKGROUND

1. Field

Embodiments relate to an adhesive composition for a polarizing plate, a polarizing plate including an adhesive layer prepared from the adhesive composition, and an optical member including an adhesive layer prepared from the adhesive composition.

2. Description of the Related Art

Polarizing plates may include polarizing devices including an iodine compound or a dichroic polarizing material arranged in a uniform direction. Polarizing plates may have a multilayer structure in which triacetyl cellulose (TAC) films (as protective films) are formed on both surfaces of a polarizing device to protect the polarizing device. Polarizing plates may further include a retardation film having a unidirectional molecular arrangement or a wide-viewing angle compensation film, such as a liquid crystal film.

SUMMARY

Embodiments are directed to an adhesive composition for a polarizing plate, a polarizing plate including an adhesive layer prepared from the adhesive composition, and an optical member including an adhesive layer prepared from the adhesive composition.

The embodiments may be realized by providing a polarizing plate including an adhesive layer, the adhesive layer being prepared from an adhesive composition including a (meth) acrylic copolymer, a crosslinking agent, and a tackifier, the tackifier including an acrylic modified petroleum resin represented by Formula 1:

R'—CO—O—R    [Formula 1]

wherein R' is a petroleum resin and R is a $C_1$-$C_{20}$ alkyl group or a $C_6$-$C_{50}$ aryl group.

The acrylic modified petroleum resin may have a structure represented by Formula 2:

[Formula 2]

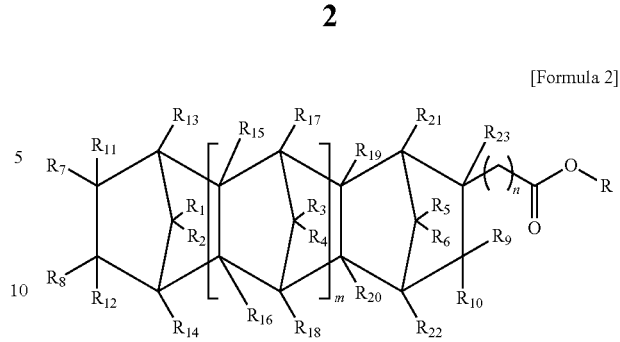

wherein R is a $C_1$-$C_{20}$ alkyl group or a $C_6$-$C_{50}$ aryl group, $R_1$ to $R_{23}$ are each independently hydrogen or a $C_1$-$C_5$ alkyl group, n is an integer from 0 to about 5, and m is an integer from 0 to about 10.

Each of $R_1$ to $R_{23}$ in Formula 2 is hydrogen and n is 0.

The acrylic modified petroleum resin may have a softening point of about 50° C. to about 150° C.

The acrylic modified petroleum resin may be present in the adhesive composition in an amount of about 0.1 to about 10 parts by weight, based on 100 parts by weight of the (meth) acrylic copolymer.

The (meth)acrylic copolymer may be a copolymer of a monomer mixture including a (meth)acrylic monomer having a hydroxyl group.

The (meth)acrylic copolymer may be a copolymer of a monomer mixture including a vinyl monomer having a hydroxyl group and a vinyl monomer having a carboxylic acid group.

The monomer mixture may include at least about 0.5 wt % of the vinyl monomer having a hydroxyl group, and at least about 0.1 wt % of the vinyl monomer having a carboxylic acid group.

The (meth)acrylic copolymer may be a copolymer of a vinyl monomer having a hydroxyl group, a vinyl monomer having a carboxylic acid group, a vinyl monomer having an alkyl group, and a vinyl monomer having an aromatic group, and at least one of the vinyl monomer having a hydroxyl group, the vinyl monomer having a carboxylic acid group, the vinyl monomer having an alkyl group, and the vinyl monomer having an aromatic group is a (meth)acrylic monomer.

The crosslinking agent may be a mixture of an isocyanate crosslinking agent and an epoxy crosslinking agent.

The composition may further include a crosslinking accelerator, a silane coupling agent, or a mixture thereof.

The composition may include the crosslinking accelerator, the crosslinking accelerator being selected from the group of metal compounds, metals, and mixtures thereof.

The composition may include the crosslinking accelerator, the crosslinking accelerator being present in an amount of about 0.001 to about 1 part by weight, based on 100 parts by weight of the (meth)acrylic copolymer.

The embodiments may also be realized by providing an optical member including an adhesive layer, the adhesive layer including a tackifier, wherein the tackifier includes an acrylic modified petroleum resin having softening point of about 50° C. to about 150° C., and wherein the optical member has a brightness difference of not greater than about 1%, as determined by Equation 1:

$\Delta L=[(a+b+d+e)/4]-c$    [Equation 1]

wherein a, b, d and e represent brightness values measured at central points of sides of a panel including the optical member, and c represents a brightness value of a center of the panel including the optical member.

The acrylic modified petroleum resin may have a structure represented by Formula 2:

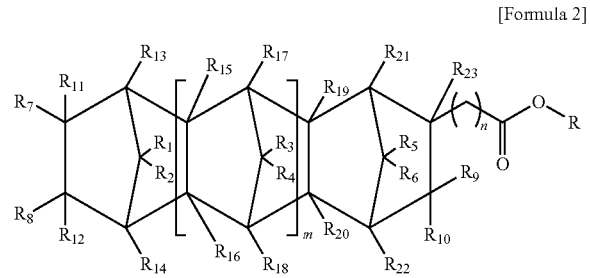

[Formula 2]

wherein R is a $C_1$-$C_{20}$ alkyl group or a $C_6$-$C_{50}$ aryl group, $R_1$ to $R_{23}$ are each independently hydrogen or a $C_1$-$C_5$ alkyl group, n is an integer from 0 to about 5, and m is an integer from 0 to about 10.

Each of $R_1$ to $R_{23}$ in Formula 2 may be hydrogen and n is 0.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
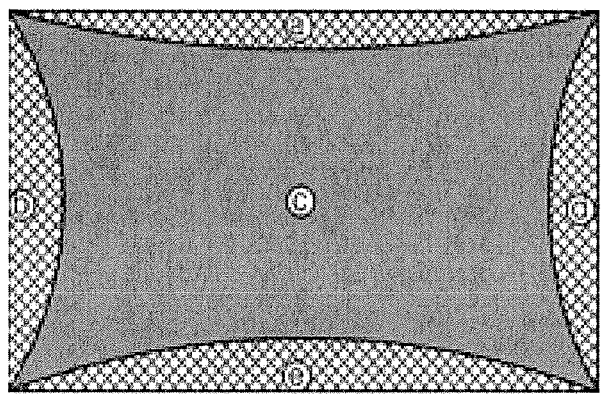
FIG. 1 illustrates sectional view of a specimen for evaluation of light leakage, according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

An embodiment provides an adhesive composition for a polarizing plate including a (meth)acrylic copolymer, an acrylic modified petroleum resin (as a tackifier), and a crosslinking agent.

(Meth)Acrylic Copolymer

The (meth)acrylic copolymer may include a copolymer of a monomer mixture including a (meth)acrylic monomer having a hydroxyl group capable of reacting with the crosslinking agent.

The (meth)acrylic copolymer may have a weight average molecular weight of about 400,000 to about 2,500,000 g/mol, e.g., about 1,500,000 to about 2,000,000 g/mol. Within this range, good durability under extreme conditions (such as high temperature and high humidity conditions) and good coatability of the adhesive composition may be ensured.

The (meth)acrylic copolymer may be a copolymer prepared by polymerization of a monomer mixture including at least about 0.5 wt % of a vinyl monomer having a hydroxyl group and at least about 0.1 wt % of a vinyl monomer having a carboxylic acid group. In an implementation, the monomer mixture may include about 0.5 wt % to about 5 wt % of a vinyl monomer having a hydroxyl group and about 0.1 wt % to about 3 wt % of a vinyl monomer having a carboxylic acid group.

The (meth)acrylic copolymer may be a copolymer of a vinyl monomer having a hydroxyl group, a vinyl monomer having a carboxylic acid group, a vinyl monomer having an alkyl group, and a vinyl monomer having an aromatic group.

At least one vinyl monomer of the vinyl monomer having a hydroxyl group, the vinyl monomer having a carboxylic acid group, the vinyl monomer having an alkyl group, and the vinyl monomer having an aromatic group may be a (meth)acrylic monomer.

The vinyl monomer having a hydroxyl group may be a (meth)acrylic acid ester having a hydroxyl group. In an implementation, the (meth)acrylic acid ester having a hydroxyl group may be (meth)acrylic acid ester having a $C_1$-$C_{20}$ alkyl group and having at least one terminal hydroxyl group or containing at least one hydroxyl group in the structure. For example, the vinyl monomer having a hydroxyl group may include at least one vinyl monomer selected from the group of 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, 2-hydroxy-3-phenyloxypropyl (meth)acrylate, and 1,6-cyclohexanedimethanol mono(meth)acrylate. Repeating units of the vinyl monomer having a hydroxyl group may be present in an amount of about 0.5 to about 5 wt %, e.g., about 0.5 to about 3 wt %, based on a weight of the (meth)acrylic copolymer. Within this range, improved durability may be obtained.

The vinyl monomer having a carboxylic acid group may be a $C_1$-$C_{10}$ (meth)acrylic acid ester having at least one terminal carboxylic acid group or containing at least one carboxylic acid group in the structure, or a carboxylic acid having a vinyl or (meth)acrylate group. For example, the vinyl monomer having a carboxylic acid group may include at least one acid selected from the group of (meth)acrylic acid, itaconic acid, crotonic acid, maleic acid, and fumaric acid. Repeating units of the vinyl monomer having a carboxylic acid group may be present in an amount of about 0.1 wt % to about 3 wt %, e.g., about 0.1 to about 1 wt %, based on the weight of the (meth)acrylic copolymer. Within this range, improved adhesiveness may be obtained.

The vinyl monomer having an alkyl group may include a (meth)acrylic acid ester having a linear or branched $C_1$-$C_{20}$ acyclic alkyl group, e.g., as a (meth)acrylic monomer having an alkyl group. For example, the vinyl monomer having an alkyl group may include at least one (meth)acrylate selected from the group of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, isooctyl (meth)acrylate, nonyl (meth)acrylate, decyl (meth)acrylate, and dodecyl (meth)acrylate. Repeating units of the vinyl monomer having an alkyl group may be present in an amount of about 50 to about 89.4 wt %, e.g., about 60 wt % to about 75 wt %, based on the weight of the (meth)acrylic copolymer. Within this range, improved durability of the adhesive may be expected and improved initial adhesive strength may be obtained.

The vinyl monomer having an aromatic group may be a (meth)acrylate having an aromatic group, e.g., as a (meth) acrylic monomer having an aromatic group. For example, the vinyl monomer having an aromatic group may have a structure of Formula 4, below.

[Formula 4]

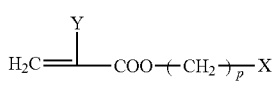

In Formula 4, Y may be hydrogen or a $C_1$-$C_5$ alkyl group, p may be an integer from 0 to about 10, and X may be selected from the group of a phenyl, phenoxy, ethylphenoxy, methylphenyl, methylethylphenyl, methoxyphenyl, propylphenyl, cyclohexylphenyl, chlorophenyl, bromophenyl, phenylphenyl, benzyl, and benzylphenyl group.

The (meth)acrylic monomer having an aromatic group may include, e.g., at least one (meth)acrylate selected from the group of phenyl (meth)acrylate, phenoxy (meth)acrylate, 2-ethylphenoxy (meth)acrylate, benzyl (meth)acrylate, 2-phenylethyl (meth)acrylate, 3-phenylpropyl (meth)acrylate, 4-phenylbutyl (meth)acrylate, 2,2-(methylphenyl)ethyl (meth)acrylate, 2-(3-methylphenyl)ethyl (meth)acrylate, 2-(4-methylphenyl)ethyl (meth)acrylate, 2-(4-propylphenyl) ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)ethyl (meth)acrylate, 2-(3-chlorophenyl)ethyl (meth)acrylate, 2-(4-chlorophenyl)ethyl (meth)acrylate, 2-(4-bromophenyl)ethyl (meth)acrylate, 2-(3-phenylphenyl) ethyl (meth)acrylate, and 2-(4-benzylphenyl)ethyl (meth) acrylate. Repeating units of the vinyl monomer having an aromatic group may be present in an amount of about 10 to about 42 wt %, e.g., about 15 to about 35 wt %, based on the weight of the (meth)acrylic copolymer. Within this range, improved processability may be obtained and stress at high temperature may be effectively suppressed.

The (meth)acrylic copolymer may be prepared by a suitable method. For example, the (meth)acrylic copolymer may be prepared by solution polymerization, photopolymerization, bulk polymerization, or emulsion polymerization. In an implementation, the (meth)acrylic copolymer may be prepared by solution polymerization. A polymerization temperature may be, e.g., about 50° C. to about 140° C. The polymerization may be carried out in the presence of an initiator. The initiator may be a suitable initiator, e.g., an azo polymerization initiator, such as azobisisobutyronitrile or azobiscyclohexanecarbonitrile, and/or a peroxide, such as benzoyl peroxide or acetyl peroxide.

Crosslinking Agent

Examples of a crosslinking agent suitable for use in the adhesive composition may include an isocyanate, epoxy, aziridine, melamine, amine, imide, carbodiimide, and amide crosslinking agent. These crosslinking agents may be used alone or as a mixture thereof.

In an implementation, the crosslinking agent may be a mixture of an isocyanate crosslinking agent and an epoxy crosslinking agent. For example, the mixture may include about 10 wt % to about 90 wt % of an isocyanate crosslinking agent and about 10 wt % to about 90 wt % of an epoxy crosslinking agent. In an implementation, the mixture may include about 60 wt % to about 80 wt % of an isocyanate crosslinking agent and about 20 wt % to about 40 wt % of an epoxy crosslinking agent.

A suitable isocyanate crosslinking may be used in the adhesive composition. For example, the isocyanate crosslinking agent may be selected from the group of toluene diisocyanate, 2,4-toluene diisocyanate, 2,6-toluene diisocyanate, hydrogenated toluene diisocyanate, isophorone diisocyanate, 1,3-xylene diisocyanate, 1,4-xylene diisocyanate, diphenylmethane-4,4'-diisocyanate, 1,3-bis(isocyanatomethyl)cyclohexane, tetramethylxylene diisocyanate, 1,5-naphthalene diisocyanate, hexamethylene diisocyanate, 2,2,4-trimethylhexamethylene diisocyanate, 2,4,4-trimethylhexamethylene diisocyanate, trimethylolpropane modified toluene diisocyanate, trimethylolpropane modified tolylene diisocyanate, trilene diisocyanate adducts of trimethylolpropane, xylene diisocyanate adducts of trimethylolpropane, triphenylmethane triisocyanate, polyol (trimethylolpropane) adducts thereof, and mixtures thereof.

A suitable epoxy crosslinking agent may be used in the adhesive composition. For example, the epoxy crosslinking agent may be selected from the group of triglycidyl ethers, including ethylene glycol diglycidyl ether and trimethylolpropane triglycidyl ether, N,N,N',N'-tetraglycidyl ethylenediamine, glycerin diglycidyl ether, and mixtures thereof.

The crosslinking agent may be present in the composition in an amount of about 0.1 to about 5 parts by weight, based on 100 parts by weight of the (meth)acrylic copolymer. Within this range, improved durability and reworkability may be achieved. In an implementation, the crosslinking agent may be present in the composition in an amount of about 0.1 to about 1 part by weight, based on 100 parts by weight of the (meth)acrylic copolymer.

Tackifier

The tackifier may include an acrylic modified petroleum resin. For example, the tackifier may include a liquid petroleum-based resin. Some liquid petroleum-based resins may be copolymers of monomers having no acrylic functional groups (for example, diene monomers having five carbon atoms, such as 1,3-cyclopentadiene, isoprene and piperylene). However, such petroleum-based resins may be poorly compatible with (meth)acrylic copolymers as acrylic adhesives, leading to the formation of adhesive layers that are opaque and/or poorly reworkable and may have undesirably excessive peel strength and adhesive creep.

The adhesive composition according to an embodiment may include an acrylic modified petroleum resin as the tackifier. The acrylic modified petroleum resin may be prepared by additional polymerization of a monomer having an acryl functional group with a petroleum-based resin. The acrylic modified petroleum resin may be highly compatible with the acrylic adhesive and may facilitate the formation of a highly transparent and reworkable adhesive layer.

The acrylic modified petroleum resin may be present between crosslinked products of the (meth)acrylic copolymer, due to good dispersibility thereof. As a result, the adhesive composition may realize a hard-type adhesive layer that has high adhesive strength and durability while effectively reducing and/or preventing the occurrence of light leakage without a deterioration of modulus. In addition, the use of the acrylic modified petroleum resin may help prevent the adhesive composition from leaving residue on a surface of a cell upon re-peeling, ensuring good reworkability.

The acrylic modified petroleum resin may have a softening point of about 50° C. to about 150° C. Within this range, surface migration of the tackifier may be prevented and processability may be improved. In an implementation, the softening point of the acrylic modified petroleum resin may be about 70° C. to about 110° C.

The acrylic modified petroleum resin may have a structure represented by Formula 1, below.

R'—CO—O—R [Formula 1]

In Formula 1, R' may be a petroleum resin, and R may be a $C_1$-$C_{20}$ alkyl group or a $C_6$-$C_{50}$ aryl group.

In an implementation, R' may be a liquid petroleum-based resin, e.g., a styrene, α-styrene, terpene, aromatic modified terpene, hydrogenated terpene, xylene, aliphatic, or rosin resin.

In an implementation, R' may be a styrene, α-styrene, or aromatic modified terpene resin.

In an implementation, the acrylic modified petroleum resin may have a structure represented by Formula 2, below.

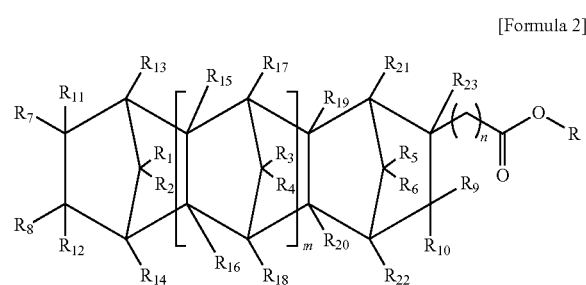

[Formula 2]

In Formula 2, R may be a $C_1$-$C_{20}$ alkyl group or a $C_6$-$C_{50}$ aryl group, $R_1$ to $R_{23}$ may each independently be hydrogen or a $C_1$-$C_5$ alkyl group, n may be an integer from 0 to about 5, and m may be an integer from 0 to about 10.

The acrylic modified petroleum resin may be present in the composition in an amount of about 0.1 to about 10 parts by weight, based on 100 parts by weight of the (meth)acrylic copolymer. Within this range, light leakage may be avoided and deterioration of transparency may be reduced and/or prevented while ensuring an appropriate range of peel strength. In an implementation, the acrylic modified petroleum resin may be present in an amount of about 0.5 to about 5 parts by weight, e.g., about 1 to about 3 parts by weight or about 1.25 to about 1.5 parts by weight, based on 100 parts by weight of the (meth)acrylic copolymer.

The acrylic modified petroleum resin may be synthesized by a suitable method. For example, the acrylic modified petroleum resin may be prepared by a Diels-Alder reaction of monomer A (for the preparation of a petroleum-based resin) with monomer B (having an acryl functional group), followed by hydrogenation. The monomer A may be a monomer having no acryl functional group, e.g., a $C_5$-$C_{10}$ diene monomer, such as 1,3-cyclopentadiene, isoprene, or piperylene. The monomer B may be a (meth)acrylic acid ester having a $C_1$-$C_{20}$ alkyl group or a $C_6$-$C_{50}$ aryl group.

For example, the resin of Formula 2 (wherein n is 0) may be synthesized by subjecting the monomer A and the monomer B to the Diels-Alder reaction to prepare an intermediate of Formula 3, below.

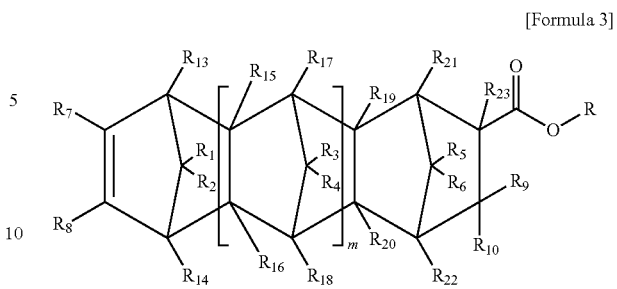

[Formula 3]

In Formula 3, R may be a $C_1$-$C_{20}$ alkyl group or a $C_6$-$C_{50}$ aryl group, $R_1$ to $R_{10}$ and $R_{13}$ to $R_{23}$ may each independently be hydrogen or a $C_1$-$C_5$ alkyl group, and m may be an integer from 0 to about 10. Then, the intermediate of Formula 3 may be hydrogenated.

In an implementation, the acrylic modified petroleum resin may be commercially available from Kolon Industries Inc. under the trade name PX-95.

The adhesive composition may further include, e.g., a crosslinking accelerator, a silane coupling agent, or a mixture thereof.

Crosslinking Accelerator

The crosslinking accelerator may function as a catalyst to promote crosslinking between the (meth)acrylic copolymer and the crosslinking agent. The crosslinking accelerator may be selected from the group of metal compounds, metals, and mixtures thereof. The metal compound may include, e.g., a tin-based compound, zinc-based compound, amine-based metal compound, titanium-based compound, bismuth-based compound, and/or aluminum-based compound. In an implementation, the metal compound may include the tin-based compound. Examples of the tin-based compound may include divalent and tetravalent organotin compounds, such as dibutyltin dilaurate, dioctyltin dilaurate, dibutyltin bis(acetylacetonate), dibutyltin oxide, dibutyltin maleate, and dibutyltin dimaleate. Examples of the zinc-based compound may include zinc oxide, zinc ammonium carbonate, zinc stearate, zinc naphthenate, and zinc 2-ethylhexanoate. However, the crosslinking accelerator is not limited to those exemplified above.

The crosslinking accelerator may be present in the composition in an amount of about 0.001 to about 1 part by weight, e.g., about 0.01 to about 0.05 parts by weight, based on 100 parts by weight of the (meth)acrylic copolymer.

Silane Coupling Agent

The silane coupling agent may help improve the stability of the adhesive composition upon contact with a glass substrate, resulting in an improvement in resistance to heat and humidity, and may help improve the adhesion reliability of the adhesive composition during long-term storage under high temperature and/or high humidity conditions.

The silane coupling agent may include, e.g., at least one silane compound selected from the group of polymerizable unsaturated group-containing silicon compounds, such as vinyltrimethoxysilane, vinyltriethoxysilane, and (meth)acryloxypropyltrimethoxysilane; silicon compounds having epoxy structures, such as gamma-epoxypropyltrimethoxysilane, 3-glycidoxypropyltrimethoxysilane, 3-glycidoxypropylmethyldimethoxysilane, and 2-(3,4-epoxycyclohexyl) ethyltrimethoxysilane; amino group-containing silicon compounds, such as 3-aminopropyltrimethoxysilane, N-(2-aminoethyl)-3-aminopropyltrimethoxysilane, and N-(2-aminoethyl)-3-aminopropylmethyldimethoxysilane; and 3-chloropropyltrimethoxysilane.

The silane coupling agent may be present in the composition in an amount of about 0.001 to about 5 parts by weight, e.g., about 0.005 to about 1 part by weight, based on 100 parts by weight of the (meth)acrylic copolymer. Within this range, a reduction in adhesive strength (even under high temperature and high humidity conditions) may be avoided, detachment and voids may be reduced and/or prevented, and excellent re-peeling properties and optical properties may be achieved.

In addition to the components described above, the adhesive composition may further include at least one additive selected from the group of solvents, UV stabilizers, antioxidants, toning agents, reinforcing agents, filers, defoaming agents, surfactants, and plasticizers. The adhesive composition may be prepared by a suitable method.

The adhesive composition may be used to form an adhesive layer of a polarizing plate. For example, the adhesive composition may be used to form an adhesive layer through which a polarizing plate is laminated on the surface of a liquid crystal cell.

Another embodiment provides an optical member including an adhesive layer. The adhesive layer may include, as a tackifier, an acrylic modified petroleum resin having a softening point of about 50° C. to about 150° C. In an implementation, the optical member may have a brightness difference of not greater than about 1%.

The brightness difference of an optical member, e.g., an optical member including a panel (e.g., a rectangular panel), may be determined by Equation 1:

$$\Delta L = [(a+b+d+e)/4] - c \quad \text{[Equation 1]}$$

In Equation 1, a, b, d and e represent brightness values of portions of the panel where light leakage occurs, particularly, brightness values measured at the central points of the sides of the panel, and c represents a brightness value of the center of the panel, as shown in FIG. 1.

The optical member may have a brightness difference not greater than about 1%, e.g., from about 0.01% to about 0.2%.

The acrylic modified petroleum resin may be as described above. The optical member may include an adhesive layer formed of the adhesive composition. The optical member may include a polarizing plate or a liquid crystal display device including a polarizing plate, but is not limited thereto.

Another embodiment provides a polarizing plate including a polarizing film (or a polarizing device) and an adhesive layer prepared from an adhesive composition. The adhesive composition may include, as a tackifier, an acrylic modified petroleum resin having a softening point of about 50° C. to about 150° C. The adhesive composition may be as described above.

The kind of the polarizing film or the polarizing device is not particularly limited. For example, the polarizing film may be produced by incorporating a polarizing component, such as iodine, into a film composed of a polyvinyl alcohol resin, and stretching the film. As the polyvinyl alcohol resin, there may be used, e.g., polyvinyl alcohol, polyvinyl formal, polyvinyl acetal or a saponification product of an ethylene-vinyl acetate copolymer.

The polarizing plate may have a multilayer structure in which protective films are laminated on one or both surfaces of a polarizing film. The protective films may include, e.g., cellulose films, such as triacetyl cellulose films, or polyester films, such as polycarbonate films or polyethylene terephthalate films. There is no particular restriction on the thickness of the protective films.

The adhesive layer may be formed on the polarizing film or the polarizing plate by a suitable method. For example, the adhesive layer may be formed by applying the adhesive composition onto the polarizing film or the polarizing plate, and drying the adhesive composition. Alternatively, the adhesive layer may be formed by applying the adhesive composition onto the surface of a releasable substrate, drying the adhesive composition, transferring the adhesive layer to the surface of the polarizing film or the polarizing plate from the releasable substrate, and aging the adhesive layer.

The polarizing plate may further include at least one functional layer selected from the group of protective layers, reflective layers, anti-glare layers, retardation plates, wide-viewing angle compensation films, and brightness enhancement films. The adhesive composition according to an embodiment may be attached to the functional layer.

In an implementation, the polarizing plate may include a polarizing film, protective films laminated on one or both surfaces of the polarizing film, and an adhesive layer formed on the polarizing film or one of the protective films. For example, the polarizing plate may include a polarizing film, protective films laminated on one or both surfaces of the polarizing film, and an adhesive layer formed on one of the protective films (wherein the adhesive layer is formed of the adhesive composition).

Figure 2:
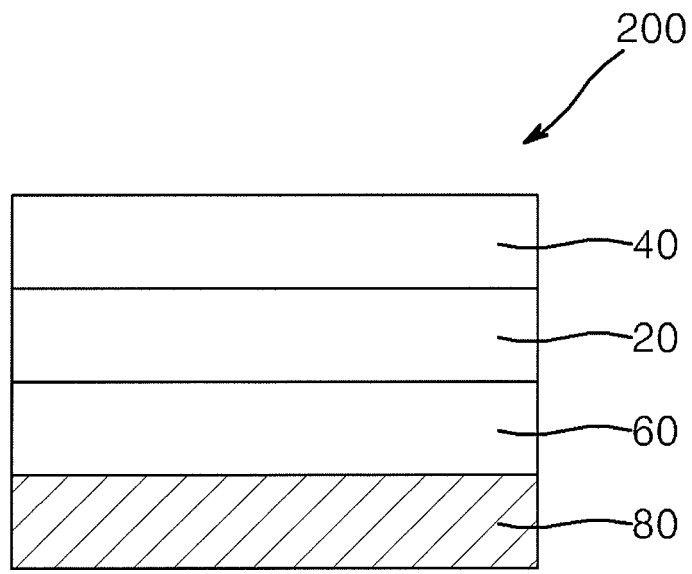
FIG. 2 illustrates a polarizing plate according to an embodiment.

FIG. 2 illustrates a polarizing plate according to an embodiment.

Referring to FIG. 2, the polarizing plate(200) may comprise a polarizing film(20); a first protective film(40) formed on upper side of the polarizing film(20); second protective film(60) formed on lower side of the polarizing film(20); and an adhesive layer(80) formed on lower side of the second protective film(60).

Another embodiment provides an optical member comprising an adhesive layer.

Figure 3:
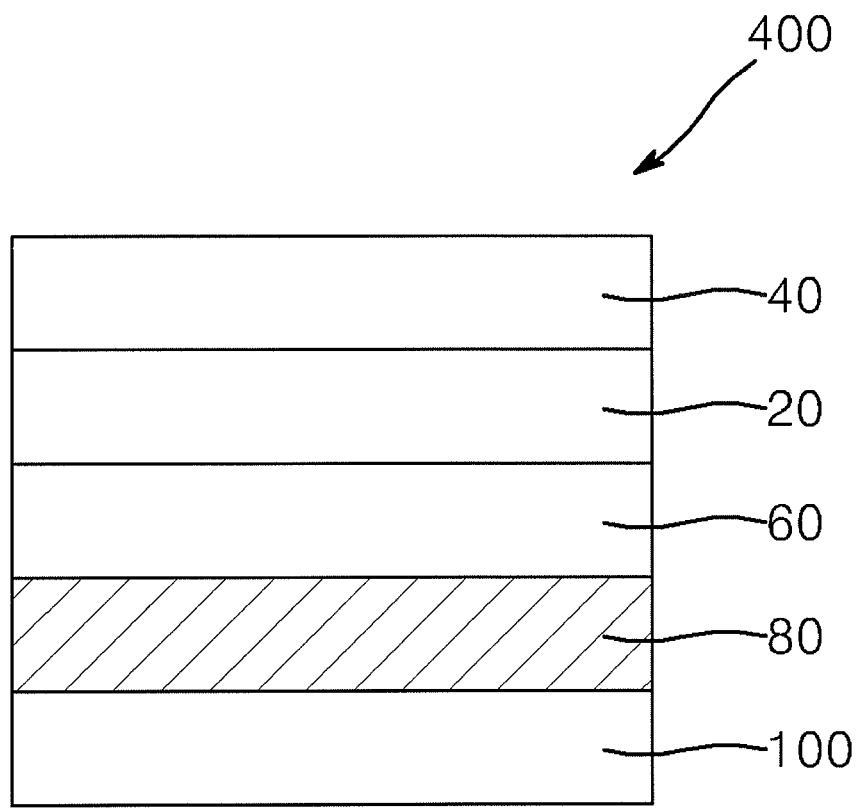
FIG. 3 illustrates an optical member according to an embodiment.

FIG. 3 illustrates an optical member according to an embodiment.

Referring to FIG. 3, the optical member (400) may comprise a polarizing film (20); a first protective film (40) formed on upper side of the polarizing film (20); second protective film (60) formed on lower side of the polarizing film (20); an adhesive layer(80) formed on lower side of the second protective film(60); and a panel(100) formed on lower side of the adhesive layer(80).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Preparative Example 1

(Meth)Acrylic Copolymer 1.0 part by weight of 4-hydroxybutyl acrylate, 68.9 parts by weight of n-butyl acrylate, 30 parts by weight of phenyl methacrylate, and 0.1 parts by weight of acrylic acid were added to a 1 L reactor equipped with a cooling system for reflux of nitrogen gas and ease of temperature control. Then, 120 parts by weight of ethyl acetate was added to the reactor. After purging with nitrogen gas for 60 minutes to remove oxygen, the temperature was maintained at 60° C. The reaction was allowed to proceed at 60° C. for 8 hr in the presence of 2,2'-azobisisobutyronitrile (AIBN) as a reaction initiator, yielding a (meth)acrylic copolymer. The reaction initiator was used in an amount of 0.05 parts by weight, based on 100 parts by weight of the acrylic copolymer. The acrylic copolymer was found to have a weight average molecular weight of 1,500,000 g/mol.

Detailed specifications of components used in Examples 1-2 and Comparative Examples 1-2 were as follows.

(A) The methacrylic copolymer prepared in Preparative Example 1 was used as a (meth)acrylic copolymer.

(B) (B1) Trimethylolpropane modified tolylene diisocyanate (CORONATE-L, Nippon Polyurethane Industry, Co., Ltd.) was used as an isocyanate crosslinking agent, and (B2) TETRAD-C (Mitsubishi Gas Chemical Company) was used as an epoxy crosslinking agent.

(C) (C1) An acrylic modified petroleum resin (PX-95, Kolon Industries Inc.) and (C2) a general aromatic petroleum resin (HIKOTACK P-90, Kolon Industries Inc.) were used as tackifiers.

(D) An inorganic catalyst (Dibutyltin dilaurate (DBTDL), K-catalyst, Sn) was used as a crosslinking accelerator.

(E) 3-Glycidoxypropyltrimethoxysilane (KBM-403, Shin-Etsu Chemical Co., Ltd.) was used as a silane coupling agent.

Examples 1-2 and Comparative Examples 1-2

As shown in Table 1, the (meth)acrylic copolymer, the crosslinking agents, the tackifiers, the crosslinking accelerator and the silane coupling agent were added to 10 parts by weight of methyl ethyl ketone (as a solvent) to prepare adhesive compositions.

TABLE 1

| | | Example 1 | Example 2 | Comparative Example 1 | Comparative Example 2 |
|---|---|---|---|---|---|
| (A) | | 100 | 100 | 100 | 100 |
| (B) | (B1) | 0.35 | 0.35 | 0.35 | 0.35 |
| | (B2) | 0.15 | 0.15 | 0.15 | 0.15 |
| (C) | (C1) | 1.25 | 1.5 | — | — |
| | (C2) | — | — | 1.25 | 1.5 |
| (D) | | 0.015 | 0.015 | 0.015 | 0.015 |
| (E) | | 0.08 | 0.08 | 0.08 | 0.08 |

Experimental Example 1

Physical properties of the adhesive compositions were evaluated, and the results are shown in Table 2, below.

(1) Light leakage: Each of the adhesive composition was coated to a thickness of 20 to 30 μm on polarizing plates (each 100 mm×175 mm) and allowed to stand at 35° C. for 5 days. The polarizing plates, on which the cured adhesive layer was formed, were attached to both surfaces of a glass substrate (400 mm×200 mm×15 mm) such that light axes crossed each other, to produce a specimen. After standing at 80° C. for 250 hr or at 60° C. and 90% RH for 250 hr (which are conditions for testing humidity and heat resistance), the specimen was allowed to stand at 25° C. for at least 1 hr. After driving a liquid crystal display device, the brightness of the front surface of a display panel was measured at a height of 1 m above the display panel using a brightness meter (RISA, Hiland). The brightness "c" of the center of the panel and the brightness values "a," "b," "d," and "e" of portions of the panel where light leakage occurred (as shown in FIG. 1) were measured. The light leakage, i.e. the brightness difference, was determined from the measured brightness values. The brightness values a, b, d and e were measured at the central points (a), (b), (d) and (e) of the sides of the panel, respectively. Specifically, each of the width and length of the panel was divided into 30 equal portions, to produce (w, 1) coordinates. The (w, 1) coordinates (2,15), (15,2), (15,29) and (29, 15) were defined as (a), (b), (d) and (e), respectively. The (w, 1) coordinates of the point (c) were (15,15). The degree of light leakage (ΔL) was quantified by Equation 1, below.

$$\Delta L = [(a+b+d+e)/4] - c \quad \text{[Equation 1]}$$

In Equation 1, a, b, d and e represent brightness values measured at the central points of the sides of the panel, and c represents a brightness value of the center of the panel.

(2) Durability: Each of the adhesive composition was coated on polarizing plates (each 100 mm×175 mm). The coated polarizing plates were attached to both surfaces of a glass substrate and pressed under a pressure of 4-5 kg/cm$^2$ to manufacture a specimen. This procedure was performed in a clean room so as to avoid the formation of voids in the specimen and protect the specimen from the ingress of foreign matter. After standing at 80° C. for 500 hr, an observation was made as to whether voids were formed or peeling occurred to evaluate the heat resistance of the specimen. For evaluation of humidity and heat resistance, the specimen was allowed to stand at 60° C. and 90% RH for 500 hr and an observation was made as to whether voids were formed or peeling occurred. After additional standing at 25° C. for 1 hr, the humidity and heat resistance of the specimen was evaluated by visual observation or microscopy, based on the following criteria:

○: No voids or peeling
Δ: Some voids or slight peeling
x: Many voids or severe peeling (3) Storage modulus: Each of the adhesive compositions was applied onto a polyethylene terephthalate film, dried, and cut into a circular specimen having a thickness of 500 μm and a diameter of 8 mm. The storage modulus of the specimen was measured using a rheometer (ARES G2, TA Instrument) in a frequency sweep mode under the following conditions: 1 rad, strain 0.1%, frequency 2 Hz, 25° C., 5 mm cone and 5 mm plate.

(4) Coating solution appearance: After standing at 25° C. for 1 day, a visual observation was made as to whether the adhesive compositions were transparent or opaque.

(5) Reworkability/cuttability: Each of the adhesive compositions was coated on polarizing plates (each 400 mm×250 mm). The coated polarizing plates were cut using a Thomson cutter, and the cross-sections of the adhesive layers were observed. The polarizing plates were attached to both surfaces of a glass substrate and pressed under a pressure of 4-5 kg/cm$^2$ to manufacture a specimen. After standing at 70° C. for 6 hr, the specimen was observed to determine whether the adhesive left residue on the glass substrate while reworking at 25° C. for at least 1 hr with slow cooling, and the reworkability thereof was evaluated based on the following criteria:

○: Residue of the adhesive remained on the cut surface without release (i.e. no residue upon rework).
Δ: Most residue of the adhesive remained on the cut surface with slight release (i.e. slight residue upon rework)
x: Much residue of the adhesive was released from the cut surface (i.e. much residue upon rework)

(6) Peel strength: Each of the adhesives was coated on a glass substrate. The 180° peel strength between the adhesive and the glass substrate was measured by the method specified in JIS 2107. The adhesive layer was cut to a size of 25 mm×100 mm and laminated on the surface of glass. After the adhesive layer and the glass substrate were connected to upper and lower jigs, respectively, in a 30 kgf load cell using a texture analyzer, a load required to peel the adhesive layer from the glass substrate was measured at a tensile rate of 300 mm/min.

(7) Adhesive creep (m): A polarizing plate was produced using each of the adhesive compositions. The polarizing plate was attached to a glass substrate such that the contact area was 1.5 cm×1.5 cm. The resulting structure was left to stand at 25° C. for 3 days to manufacture a specimen. When a force of 2,250 kgf was applied to the specimen using a universal test machine (UTM) for 10 sec, the pushed distance (μm) of the specimen was measured.

TABLE 2

|  | Example 1 | Example 2 | Comparative Example 1 | Comparative Example 2 |
|---|---|---|---|---|
| Light leakage (%) | 0.06 | 0.07 | 1.5 | 1.7 |
| Durability   Heat resistance | ○ | ○ | ○ | ○ |
|   Humidity and heat resistance | ○ | ○ | ○ | ○ |
| Storage modulus (G', MPa) | 0.25 | 0.20 | 0.15 | 0.15 |
| Coating solution appearance | Transparent | Transparent | Opaque | Opaque |
| Reworkability/Cuttability | ○ | ○ | ○ | ○ |
| Peel strength (gf/25 mm) | 450 ± 20 | 560 ± 20 | 620 ± 20 | 800 ± 20 |
| Creep (μm) | 50 ± 10 | 70 ± 10 | 90 ± 10 | 120 ± 10 |

As may be seen from the results in Table 2, the adhesive layers formed using the adhesive compositions of Examples 1-2 were highly durable while minimizing the occurrence of light leakage. In addition, the adhesive compositions of Examples 1-2 were highly reworkable without deterioration of storage modulus and, as a result, there was no surface migration of the tackifier in the adhesive layers. Furthermore, the compositions of Examples 1-2 had lower peel strength and creep values than the compositions of Comparative Examples 1-2, each of which included the general petroleum-based resin. The compositions of Examples 1-2 were transparent, indicating that the tackifier of the compositions of Examples 1-2 was highly compatible and miscible with the (meth)acrylic copolymer. In contrast, poor miscibility of the general petroleum-based resin with the (meth)acrylic copolymer made the coating solutions opaque in appearance and caused higher peel strength and creep values.

By way of summation and review, films in polarizing plates may exhibit different physical properties due to differences in molecular structure and composition of their constituent materials. For example, films may have poor dimensional stability under high temperature and high humidity conditions due to expansion or shrinkage of constituent materials having a unidirectional molecular arrangement. When a polarizing plate is fixed by an adhesive and expands or shrinks under high temperature and/or high humidity conditions, stress may be concentrated at protective films, and birefringence may take place. As a result, light leakage may occur in the polarizing plate.

Increasing a molecular weight or crosslinking density of constituent components of adhesives may help control the shrinkage of films. However, such designs based on light leakage prevention may cause defects of polarizing plates, thereby causing undesirable durability deterioration.

Liquid petroleum-based tackifiers may be used to achieve controlled modulus and improved adhesive strength. However, the tackifiers may undergo surface migration under extreme conditions due to their poor compatibility with (meth)acrylic copolymers (as acrylic adhesive components). This surface migration may cause contamination of the surface of adherends, leading to low reusability of the adherends. A large difference in refractive index from the (meth)acrylic copolymers may also lead to deterioration of optical properties, e.g., an increase in haze.

The embodiments provide an adhesive composition for forming an adhesive layer of a polarizing plate that includes a (meth)acrylic copolymer (as an adhesive component) and an acrylic modified petroleum resin (as a tackifier that is highly compatible with the (meth)acrylic copolymer). The presence of the acrylic modified petroleum resin may help ensure high durability of the adhesive layer while avoiding undesirable light leakage. The high compatibility of the acrylic modified petroleum resin with the (meth)acrylic copolymer may help increase transparency of the adhesive layer, and may help improve reworkability and adhesiveness.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A polarizing plate comprising an adhesive layer, the adhesive layer being prepared from an adhesive composition including:
    a (meth)acrylic copolymer,
    a crosslinking agent, and
    a tackifier, the tackifier including a petroleum resin represented by Formula 1:

R'—CO—O—R    [Formula 1]

wherein R' is a petroleum resin and R is a $C_1$-$C_{20}$ alkyl group or a $C_6$-$C_{50}$ aryl group.

2. The polarizing plate as claimed in claim 1, wherein the petroleum resin has a structure represented by Formula 2:

[Formula 2]

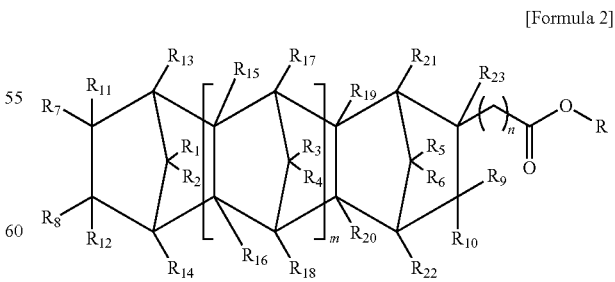

wherein R is a $C_1$-$C_{20}$ alkyl group or a $C_6$-$C_{50}$ aryl group, $R_1$ to $R_{23}$ are each independently hydrogen or a $C_1$-$C_5$ alkyl group, n is an integer from 0 to about 5, and m is an integer from 0 to about 10.

3. The polarizing plate as claimed in claim 2, wherein each of $R_1$ to $R_{23}$ in Formula 2 is hydrogen and n is 0.

4. The polarizing plate as claimed in claim 1, wherein the petroleum resin has a softening point of about 50° C. to about 150° C.

5. The polarizing plate as claimed in claim 1, wherein petroleum resin is present in the adhesive composition in an amount of about 0.1 to about 10 parts by weight, based on 100 parts by weight of the (meth)acrylic copolymer.

6. The polarizing plate as claimed in claim 1, wherein the (meth)acrylic copolymer is a copolymer of a monomer mixture including a (meth)acrylic monomer having a hydroxyl group.

7. The polarizing plate as claimed in claim 1, wherein the (meth)acrylic copolymer is a copolymer of a monomer mixture including a vinyl monomer having a hydroxyl group and a vinyl monomer having a carboxylic acid group.

8. The polarizing plate as claimed in claim 7, wherein the monomer mixture includes:
   at least about 0.5 wt % of the vinyl monomer having a hydroxyl group, and
   at least about 0.1 wt % of the vinyl monomer having a carboxylic acid group.

9. The polarizing plate as claimed in claim 1, wherein:
   the (meth)acrylic copolymer is a copolymer of a vinyl monomer having a hydroxyl group, a vinyl monomer having a carboxylic acid group, a vinyl monomer having an alkyl group, and a vinyl monomer having an aromatic group, and
   at least one of the vinyl monomer having a hydroxyl group, the vinyl monomer having a carboxylic acid group, the vinyl monomer having an alkyl group, and the vinyl monomer having an aromatic group is a (meth)acrylic monomer.

10. The polarizing plate as claimed in claim 1, wherein the crosslinking agent is a mixture of an isocyanate crosslinking agent and an epoxy crosslinking agent.

11. The polarizing plate as claimed in claim 1, wherein the composition further includes a crosslinking accelerator, a silane coupling agent, or a mixture thereof.

12. The polarizing plate as claimed in claim 11, wherein the composition includes the crosslinking accelerator, the crosslinking accelerator being selected from the group of metal compounds, metals, and mixtures thereof.

13. The polarizing plate as claimed in claim 11, wherein the composition includes the crosslinking accelerator, the crosslinking accelerator being present in an amount of about 0.001 to about 1 part by weight, based on 100 parts by weight of the (meth)acrylic copolymer.

14. An optical member comprising an adhesive layer, the adhesive layer including a tackifier, wherein the tackifier includes a petroleum resin having softening point of about 50° C. to about 150° C., and
   wherein the optical member has a brightness difference of not greater than about 1%, as determined by Equation 1:

$$\Delta L = [(a+b+d+e)/4] - c \quad \text{[Equation 1]}$$

wherein a, b, d and e represent brightness values measured at central points of sides of a panel including the optical member, and c represents a brightness value of a center of the panel including the optical member.

15. The optical member as claimed in claim 14, wherein the petroleum resin has a structure represented by Formula 2:

[Formula 2]

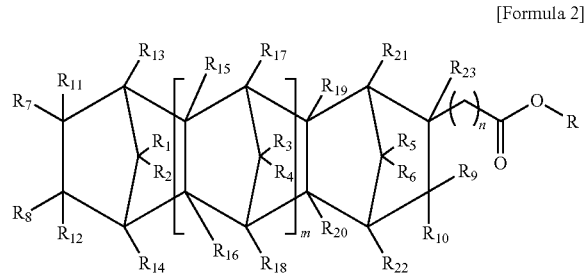

wherein R is a $C_1$-$C_{20}$ alkyl group or a $C_6$-$C_{50}$ aryl group, $R_1$ to $R_{23}$ are each independently hydrogen or a $C_1$-$C_5$ alkyl group, n is an integer from 0 to about 5, and m is an integer from 0 to about 10.

16. The optical member as claimed in claim 15, wherein each of $R_1$ to $R_{23}$ in Formula 2 is hydrogen and n is 0.

* * * * *